Sept. 22, 1964      F. T. SENS      3,150,225
APPARATUS FOR MELTING HEAT-SOFTENABLE MATERIALS
Filed Oct. 26, 1961      8 Sheets-Sheet 4
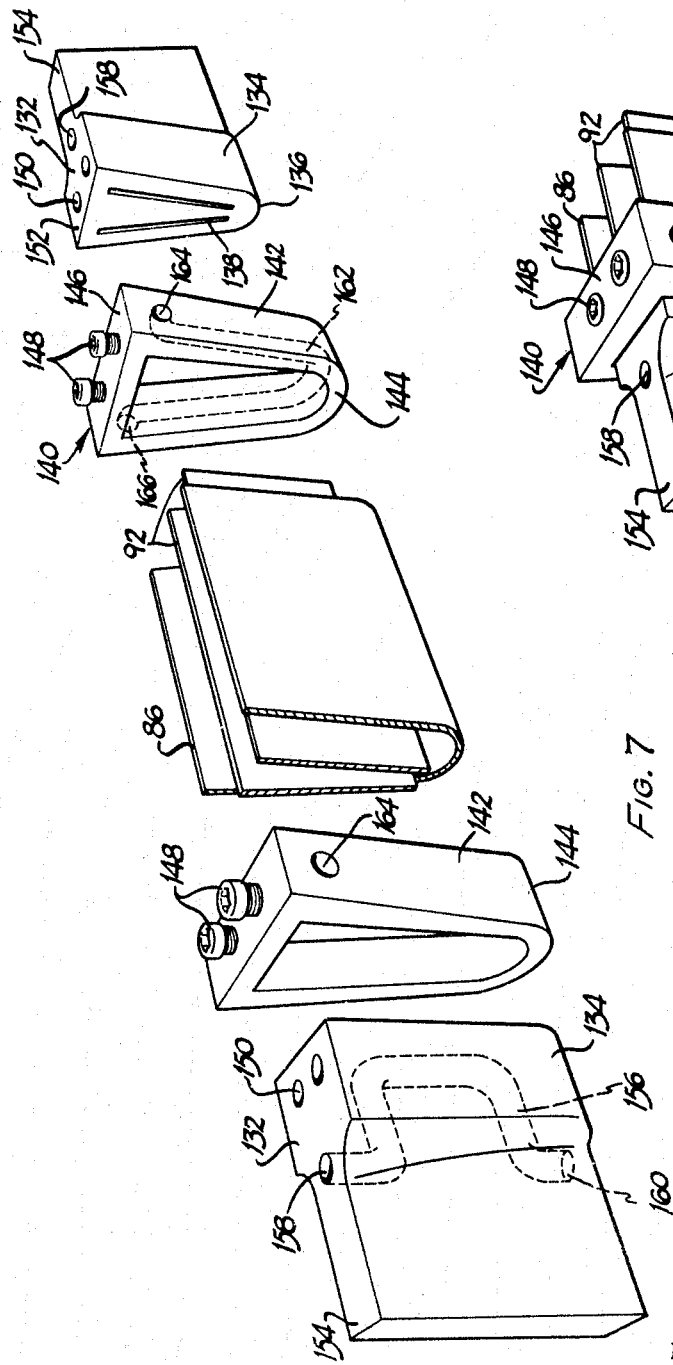
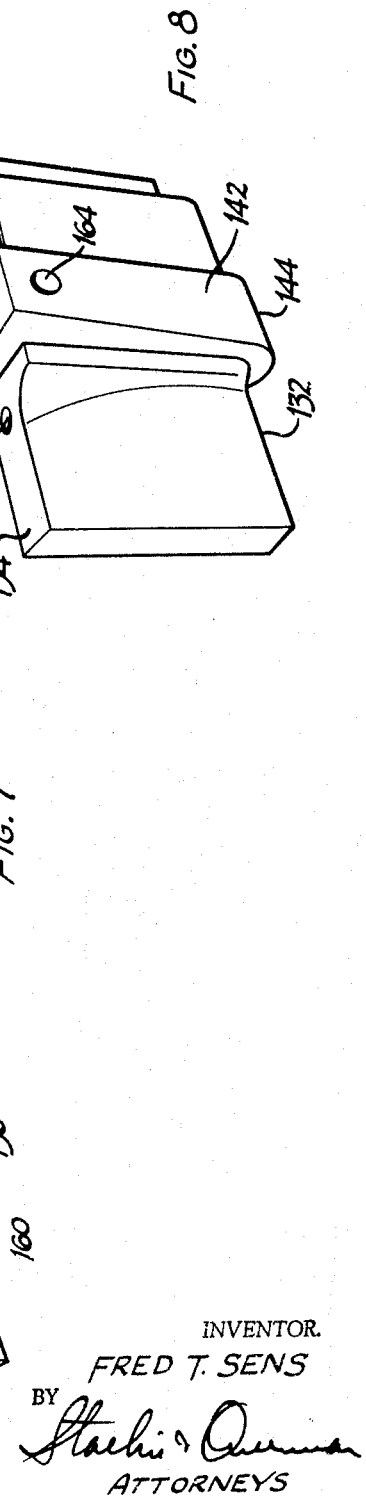
INVENTOR.
FRED T. SENS
BY
ATTORNEYS

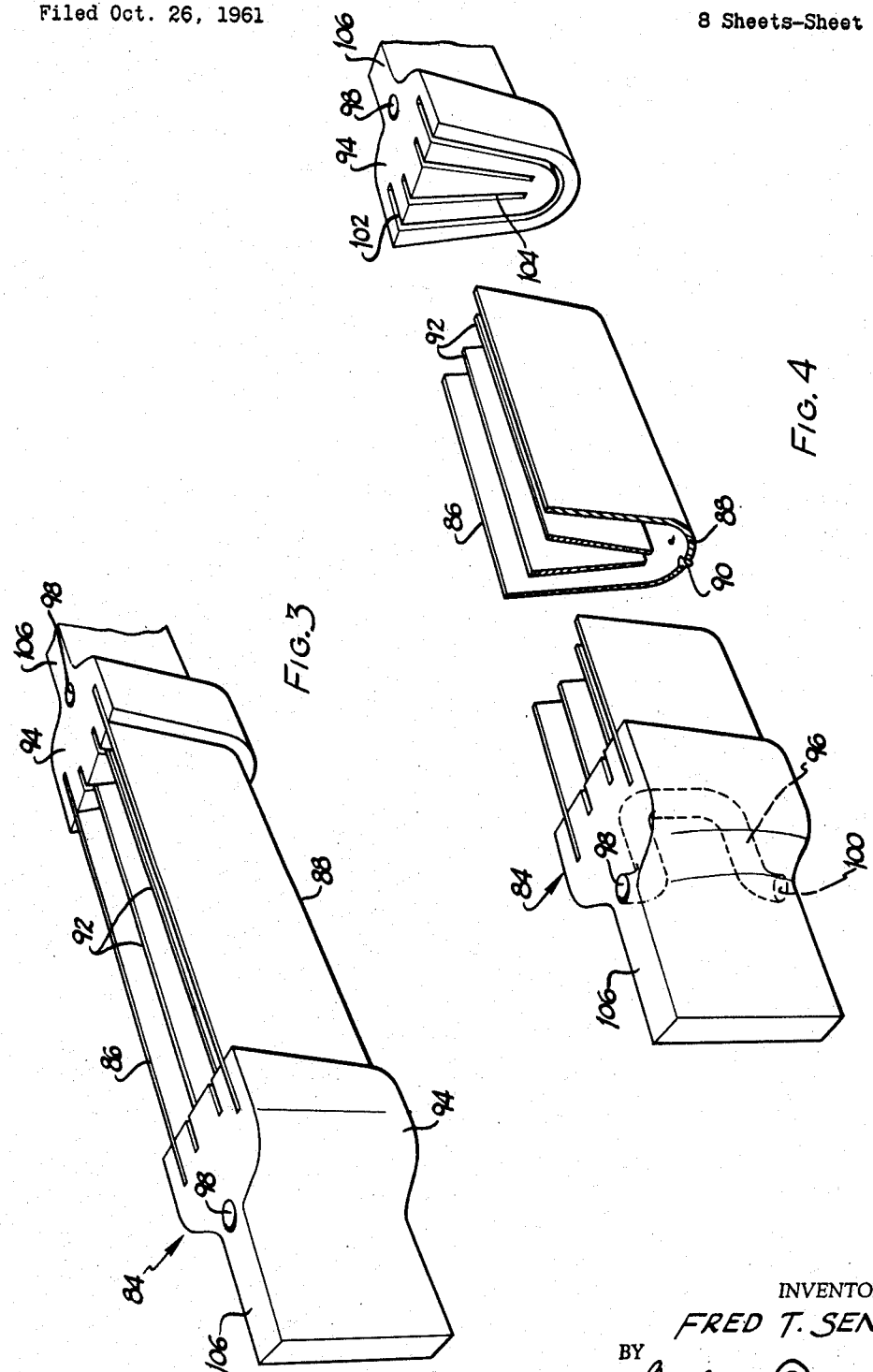

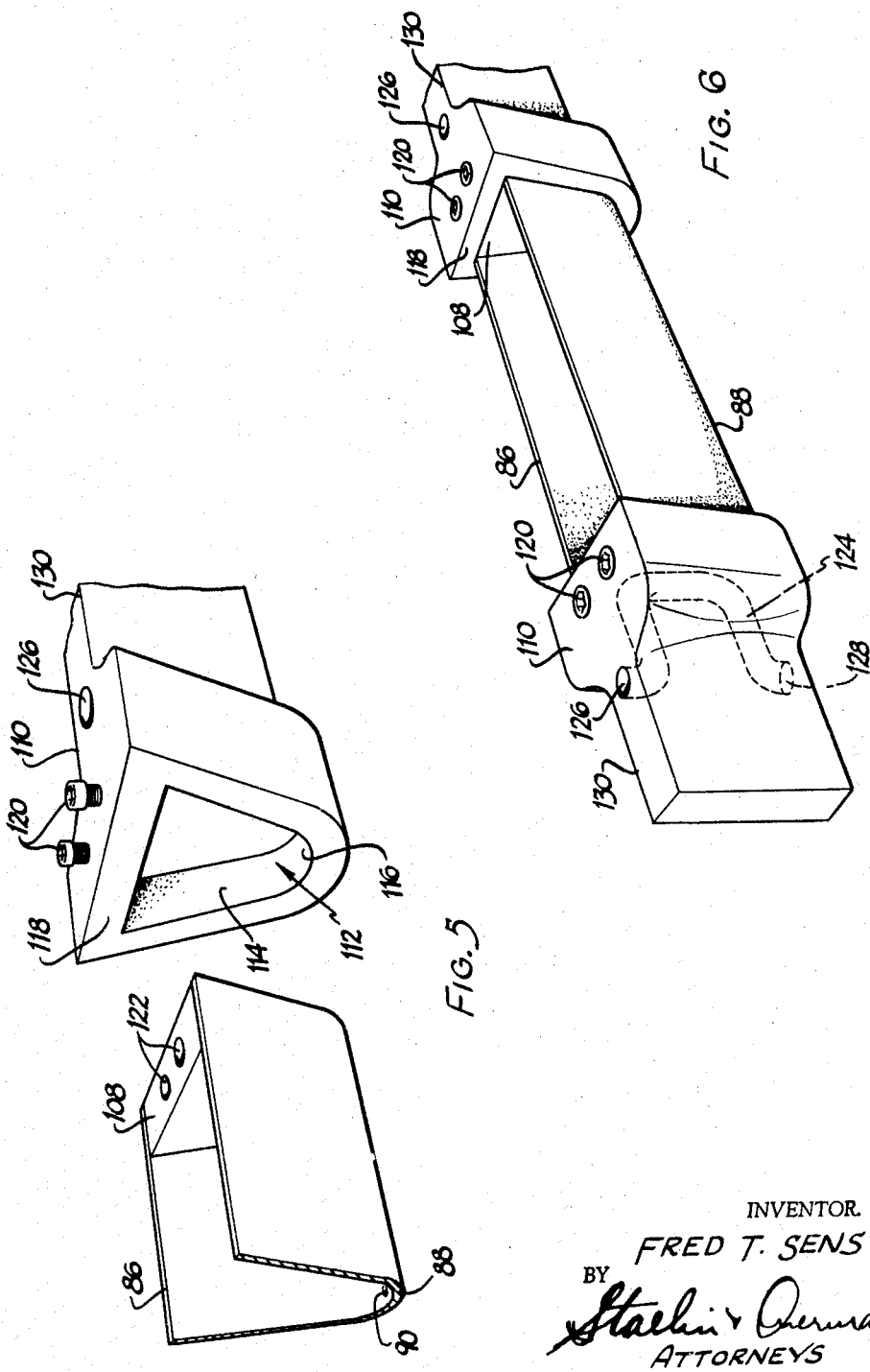

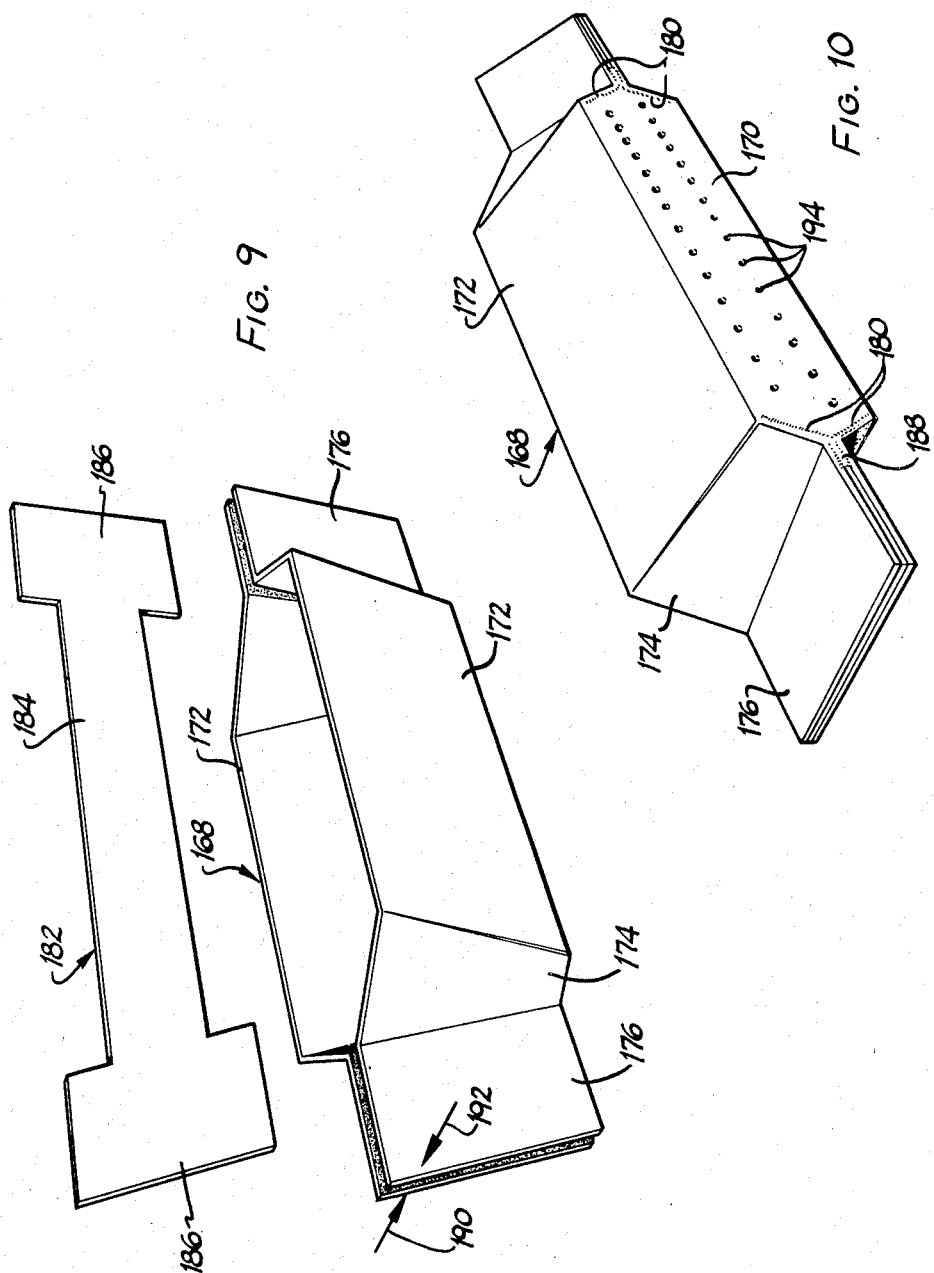

Sept. 22, 1964             F. T. SENS             3,150,225
APPARATUS FOR MELTING HEAT-SOFTENABLE MATERIALS
Filed Oct. 26, 1961             8 Sheets-Sheet 6

INVENTOR.
FRED T. SENS
BY
ATTORNEYS

Sept. 22, 1964          F. T. SENS          3,150,225

APPARATUS FOR MELTING HEAT-SOFTENABLE MATERIALS

Filed Oct. 26, 1961          8 Sheets-Sheet 7

INVENTOR.
FRED T. SENS
BY
ATTORNEYS

Sept. 22, 1964  F. T. SENS  3,150,225
APPARATUS FOR MELTING HEAT-SOFTENABLE MATERIALS
Filed Oct. 26, 1961  8 Sheets-Sheet 8

INVENTOR.
FRED T. SENS
BY
ATTORNEYS excellent# United States Patent Office 3,150,225
Patented Sept. 22, 1964

3,150,225
APPARATUS FOR MELTING HEAT-
SOFTENABLE MATERIALS
Fred T. Sens, Newark, Ohio, assignor to Owens-Corning
Fiberglas Corporation, a corporation of Delaware
Filed Oct. 26, 1961, Ser. No. 147,972
8 Claims. (Cl. 13—6)

This invention relates to apparatus for melting heat-softenable materials and more particularly to melter-feeders or bushings made of brittle and difficult to weld, refractory metals for producing continuous glass fibers and to a method of fabricating melter-feeders from such metals.

In the production of glass fibers of the continuous type, it has been found to be substantially essential to employ feeders or bushings for molten glass that are made of precious metals such as platinum. Refractory materials such as clay, clay-based bricks and the like are subject to erosion by molten glass and release infusible particles into the melt. Since continuous fibers are produced by rapidly attenuating or drawing out small streams of molten glass to a very small diameter on the order of a few microns, the slightest foreign particle may interrupt the process by causing a break in the fiber. Interruption of the process results in time-consuming and expensive loss of product; and substantially continuous attenuation is required for profitable operation.

Accordingly, bushings or feeders for producing glass fibers tof the continuous type have generally been fabricated of platinum or platinum alloyed with small amounts of iridium or rhodium to avoid contamination. While platinum has proved satisfactory for making feeders, its melting point of 3192° F. has placed a rather severe upper limit of about 2200° F. on the softening point of fibers which can be produced by its use. The fiber softening point must be maintained sufficiently below the melting point of the bushing to prevent destruction thereof by melting.

Other metals such as molybdenum, tungsten and tantalum are available which have substantially higher melting points than platinum. Thus, tungsten has a melting point of 6200° F. and molybdenum and tantalum have melting points of about 5500° F. as contrasted to the melting point of 3192° F. for platinum. Molybdenum is also well known for its high temperature stress and rupture strength and other characteristics which make its use desirable in high temperature applications.

However, the refractory metals such as molybdenum, tungsten and tantalum are extremely difficult to fabricate. The metals are both very brittle and very readily oxidizable. Thus, for example, it is substantially impossible to weld molybdenum because of these characteristics; and at present there is no known method of producing continuous sound welds in molybdenum. The welds are characterized by pin holes which cause cracks to start. Further, due to the brittle characteristics of this and the other refractory metals, the welds of any length that can be produced crack when subjected to thermal stresses. The result is that it has not been practical to fabricate glass melters from these metals by welding, as has been common prior practice with platinum and its alloys with iridium or rhodium.

If a technique could be developed for producing melter-feeders or bushings from these metals, a substantial contribution would be made to advance the art of forming high-temperature continuous fibers.

Accordingly, it is an important object of the present invention to provide a novel melter for producing high-temperature glass fibers.

Another object is to provide novel melters for heat-softenable materials that are made from brittle and difficult to weld metals, such as the refractory metals.

A further object is to provide glass melter-feeders of refractory metals, that are formed without welding.

A still further object is to provide a novel melter-feeder for heat-softenable materials, wherein the melters are produced from brittle metals, such as the refractory metals, that are of folded configuration and without welds.

Another object is to provide a fiber forming bushing for high temperature continuous glass fibers utilizing sheets of refractory metal which are folded into a fluid glass retaining shape and are characterized by extremely short welds along portions of the bottom, the welds being resistant to cracking and failure.

A still further object is to provide a novel method for fabricating melters for heat-softenable materials from brittle metals such as the refractory metals involving a folding technique that is devoid of welding.

A still further object is to provide a novel method for fabricating melters for heat-softenable materials from brittle metals such as the refractory metals that involves folding, but includes very short welds adapted to withstand thermal stresses.

Other objects of this invention will appear in the following description and appended claims, reference being had to the accompanying drawings forming a part of this specification wherein like reference characters designate corresponding parts in the several views.

In the drawings:

FIGURE 3 is a perspective view of a continuous glass fiber forming bushing made in accordance with a first embodiment of the present invention;

FIGURE 4 is a broken, partially exploded perspective view of the FIGURE 3 embodiment, showing the interrelationship of the parts thereof;

FIGURE 5 is a partial, exploded perspective view of a second embodiment of the invention;

FIGURE 6 is a complete assembled perspective view of the second embodiment of the invention;

FIGURE 7 is an exploded perspective view of a third embodiment of the invention;

FIGURE 8 is a partial assembled perspective view of the FIGURE 7 embodiment;

FIGURE 9 is an exploded perspective view of a fourth embodiment of the invention;

FIGURE 10 is a bottom, assembled perspective view of the fourth embodiment;

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

THE ENVIRONMENT

Figure 1:
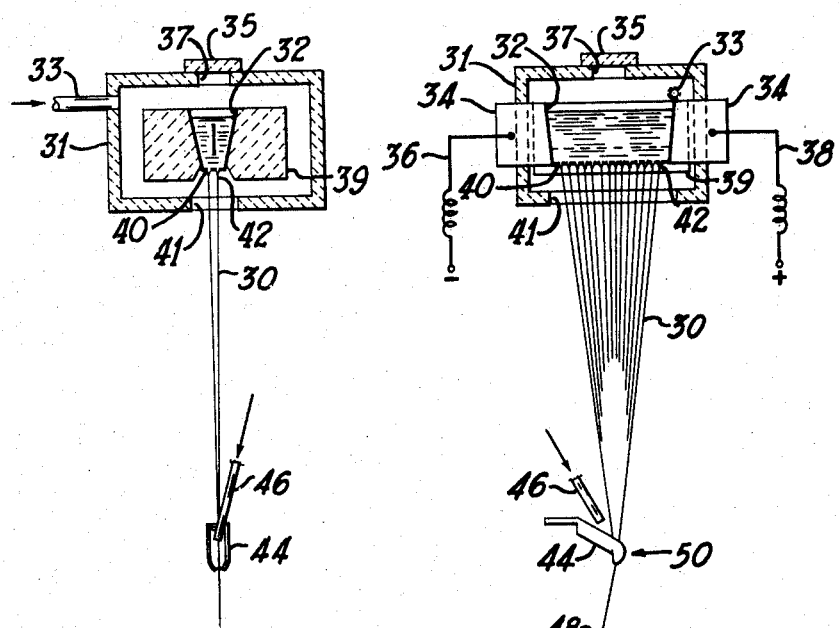
FIGURE 1 is a generalized side elevational view with some parts in section, of apparatus for producing continuous glass fibers utilizing a resistance heated molten glass feeder or bushing made of metal.
Figure 2:
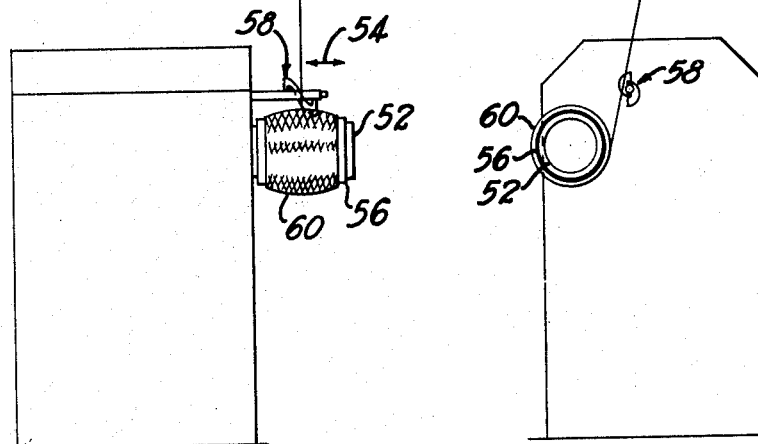
FIGURE 2 is a front elevational view with parts in section of the apparatus of FIGURE 1.

As shown in FIGURES 1 and 2, continuous glass fibers 30 are formed utilizing a melter-feeder or bushing 32 provided with electrical terminals 34 to which electric lines 36 and 38 are connected whereby electrical current is passed through the bushing to heat the same by its own resistance. An insulating refractory 39 is provided around the bushing to retain heat and improve efficiency.

Glass-forming materials are fed by gravity into the bushing 32 at a controlled rate from a suitable hopper disposed above the bushing. In the bushing 32, the glass-forming materials are converted into molten glass which exudes downwardly from apertures 40 formed in aligned array along the bottom of the bushing as small molten streams 42. The streams 42 are attenuated into the fibers 30 which are passed over a gathering pad 44, lubricated by a liquid sizing and binder from applicator 46. The fibers 30 are gathered into a strand 48 at a point 50 on the lubricated pad 44 and the strand is carried downwardly to a rapidly rotating collet 52 carrying a tube 56 upon which they are wound in reciprocated fashion as indicated by arrow 54 by a traverser 58 to provide a package 60 of selected weight, of the nature of an enlarged spool of household sewing thread. The action of the traverser provides point contact between successive turns of the strand 48 and thereby prevents sticking when the liquid size and binder dries.

THE INVENTION

According to the present invention, the refractory metals including molybdenum, tungsten and tantalum are employed to fabricate bushings which are adapted to operate at temperatures of 4500° F. or above for the production of continuous glass fibers. These metals, as has been brought out heretofore, are extremely difficult to weld; however, it has been discovered that bushings of refractory metals can be formed by a bending or folding technique whereby in one aspect of this invention no welding is required and in a second aspect of the invention only minimum welding in the form of very short welds is utilized, such welds being resistant to deterioration by thermal stresses encountered in the glass melting operation.

The manner in which construction of bushings is effected in accordance with the present invention is illustrated in the description of the various embodiments which follow.

THE FIRST EMBODIMENT

In accordance with the embodiments of FIGURES 3 and 4, a glass melting bushing 84 includes an outer retaining wall 86 fabricated from a sheet of refractory metal such as molybdenum, tungsten, tantalum or alloy thereof. As best shown in FIGURE 4, the wall 86 is formed as a trough-like structure of generally U-shape. Thus the wall is of unitary configuration and is void of any weldment. In the bottom or bight portion 88 of the wall 86 there is provided a plurality of glass feeding apertures or tips 90. The apertures 90 are effective to provide small openings through the bottom 88 whereby glass can be exuded downwardly as small streams for attenuation into fibers as described with respect to FIGURES 1 and 2. A more elaborate discussion of the glass feeding orifices 90 will be provided hereinafter with respect to the discussion of FIGURES 17, 18, 19 and 20 of the drawings.

As further shown in FIGURES 3 and 4, heater strips 92, also formed of molybdenum, tungsten or other refractory metal and cut into rectangular sheets, are positioned within the confines of the outer wall 86, and like the outer wall are heated by electrical resistance to provide a high degree of uniformity of heating of the powdered glass or glass forming materials retained within the outer wall 86.

The ends of the bushing 84 take the form of terminals 94, and these may be made of the same refractory metal as that used in the fabrication of the outer wall 86 and the heater strips 92, if desired. However, for economy and improved electrical conductivity, the terminals 94 can be fabricated of copper or copper alloys and protected from melting by the provision therein of cooling ducts 96, shown in dotted outline at the left end of the bushing 84 of FIGURE 4. The ducts 96 are provided with inlets 98 and outlets 100.

The terminals 94 are provided with generally U-shaped slots 102 to receive the ends of the outer walls 86 and straight slots 104 to receive the ends of the heater strips 92. By making slots 102 and 104 of a width slightly less than the thickness of wall 86 and strips 92, one method of joining the outer wall 86 and the heater strips 92 to the terminals 94 comprises heating the terminals to a temperature of about 500° F. to 600° F. to cause expansion thereof, permitting the wall 86 and heater strips 92 to be positioned therein, whereupon cooling of the terminals 94 results in a shrinkage which causes the wall, terminal and heater strips to be tightly compressed in fluid glass retaining relationship. Subsequently when these parts are heated to glass melting temperatures, expansion of the metal from which the wall and heater strips are made will substantially equal the expansion of the terminal 94 to provide a fluid-tight joinder.

When the terminals 94 are formed of tungsten and the wall 86 and heater strips 92 are also formed of tungsten, tantalum foil can be inserted in the slots around the ends of the walls 86 and heater strip 92 to be used to braze tungsten to tungsten.

Figure 21:
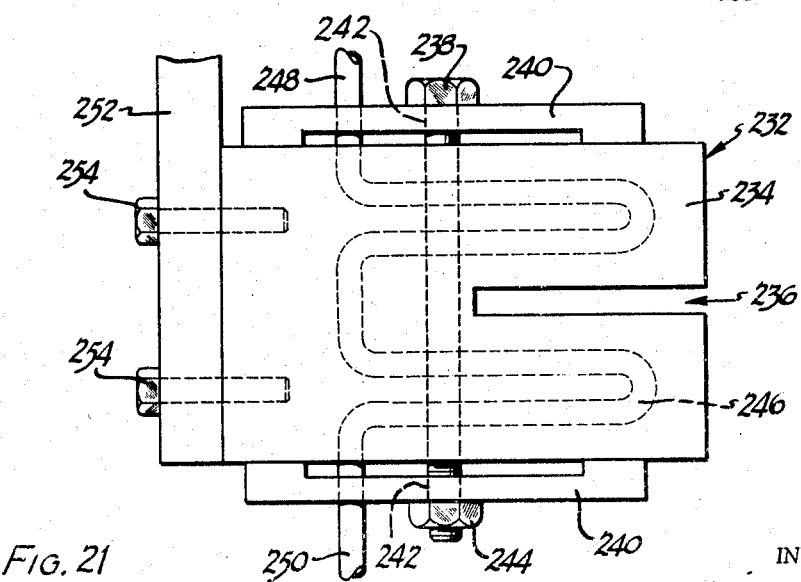
FIGURE 21 is a top plan view of a terminal clamp utilizable with the glass melting bushings of the invention.

It will be noted that the terminals 94 are of reduced section as at 106 whereby they can be inserted within the receiving slot of a terminal clamp as shown in FIGURE 21, to be described more fully hereinafter, for connection with a source of electric current. As mentioned with reference to FIGURES 1 and 2, electric current is passed through the bushing 84 to provide resistance heating of either glass or glass forming materials placed within the wall 86 and in contact with the heater strips 96. Intense heat is thereby developed to melt glass from which fibers are formed.

Thus it will be seen that the first embodiment of the invention provides a practical utilization of normally brittle refractory metals free of weldments. By utilizing water cooled terminals 94, the temperature of the glass adjacent the ends can be maintained below its fluid point to provide additional assurance that there will be no leakage at the joinder between the ends of the bushing wall and heater strips and the terminals.

THE SECOND EMBODIMENT

As shown in FIGURES 5 and 6, the second embodiment of the invention utilizes a clamping structure for retaining the ends of the bushing wall to the terminals. As shown in these figures, an outer wall 86, bent to a trough-like configuration of generally U-shape, is provided in the bottom or bight portion 88 with a plurality of glass feeding orifices 90, whereby molten streams of glass can be exuded in a downward direction for the production of fibers and a strand as illustrated in FIGURES 1 and 2. In this embodiment of the invention, a generally U-shaped block 108 of refractory metal of the type used to form the outer wall 86, is cradled within the outer wall at the end thereof. It will be noted that the U-shaped block 108 is of the same configuration as the interior of the wall 86. The terminal 110 is shaped to an exterior contour the same as that described for the terminal 94 in FIGURES 3 and 4. However, the terminal 110 is provided with a generally U-shaped recessed opening 112 having downwardly slanting side walls 114 and an arcuate bight portion 116. Across the top, the wall 118 is straight. The side walls 114, bight portion 116 and straight top wall 118 of the opening 112 are of a contour the same as the outer contour of the wall 86 with the U-shaped block 108 positioned therein. Thus the end of the wall 86 including the block 108 is slidable into the U-shaped recessed opening 112. The terminal 110 is drilled at the top wall 118 to provide holes which are threaded to receive metal set screws 120. As shown in FIGURE 5 the top of the U-shaped block 108 is provided with recesses 122 into which the ends of the set screws 120 rest when they are turned downwardly through the top wall 118 of the terminal 110. Thus when the set screws 120 are tightened, the U-shaped block 108 is pressed downwardly to retain the wall 86 in fluid-glass retaining relationship in the U-shaped recessed opening 112.

The terminals 110 are each provided with fluid cooling ducts 124 and the ducts are provided with inlet 126 and outlet openings 128 for connection with suitable conduits whereby cooling water or other suitable fluid can be passed therethrough. The terminals 110 are reduced in thickness at 130 for connection to a terminal clamp, to be described hereinafter.

Thus in accordance with the second embodiment of this invention, a novel glass fiber forming bushing is provided which is free of weldments whereby brittle refractory metals that are substantially impossible to satisfactorily weld can be employed. These novel bushings can be utilized to produce glass fibers of higher melting temperatures than can be produced in present metal bushings.

THE THIRD EMBODIMENT

As shown in FIGURES 7 and 8, the third embodiment of the invention includes an outer wall 86 of the same configuration as the FIGURES 3-6 embodiments and rectangular heater strips 92 positioned within the wall 86. It will be noted that the terminals 132 of this embodiment are of lesser width than those previously illustrated. Thus each terminal 132 is provided with a downwardly sloping side wall 134 and an arcuate bight portion 136, both of which are contoured to the interior configuration of the outer wall 86. Rectangular slots 138 are provided within the confines of the side wall 134 and the bight portion 136 to receive the ends of the heater strips 92. As shown in FIGURE 8, and as can be visualized from FIGURE 7, assembly of the unit comprises insertion of the ends of the heater strips 92 into the slots 138. Thereafter the end of the wall 86 is fitted around the wall 134 and bight portion 136 and a clamp 140 is positioned in restraining engagement around the end of the wall 86 by sliding it over the terminal 132.

The clamp 140 includes downwardly sloping side walls 142, a bight portion 144 joining the side walls at the bottom and a straight wall 146 joining the side walls 142 across the top thereof. The interior surfaces of the walls 142, bight portion 144 and top wall 146 are contoured to slide over the exterior of the wall 86 when it is positioned around the terminal 132 is closely engaging relationship.

The top wall 146 of the clamp 140 is provided with a pair of threaded holes into which are inserted set screws 148. In aligned relationship with the set screws 148 there are provided recesses 150 in the top surface 152 of the terminals 132. When the parts are assembled and the set screws 148 turned downwardly to engage the recesses 150, the clamp 140 is drawn upwardly into snug relationship with the ouside of the wall 86 bringing wall 186 into fluid-tight relationship with the downwardly sloping side wall 134 and bight portion 136 of the terminal 132.

The terminals 132 are restricted in thickness as at 154 so that a terminal clamp can be attached for introducing electric current into the assembly.

The terminals 132 are adapted to be fluid cooled and for such purpose are provided with fluid conduits 156 as shown at the left hand end of FIGURE 7. The conduits are provided with inlets 158 and outlets 160 for connection with suitable tubing for the passage of water or the like. The clamps 140 are also adapted to be fluid cooled and for such purpose are provided with fluid passages 162, which have inlet and outlet openings 164 and 166.

Thus the third embodiment also provides a novel bushing for the production of high temperature glass fibers wherein refractory metals in sheet form are utilized which are free of weldments.

THE FOURTH EMBODIMENT

The present invention also provides a continuous glass fiber forming bushing wherein refractory metals are utilized, the bushing being of such configuration that only four extremely short welds are provided in the base thereof. Whereas very short welds can be satisfactorily tolerated in refractory metals, this characteristic is utilized in the present structure to provide a fiber forming bushing which is the substantial equivalent of a weld-free structure.

As shown in FIGURES 9-13 of the drawings, a sheet 168 of refractory metal such as molybdenum or the like, as contemplated within the broad scope of the invention, is folded upwardly along each of the side lines of a base 170 to form elongated side walls 172, inwardly extending end wall halves 174 and axially extending tab portions 176.

Figure 11:
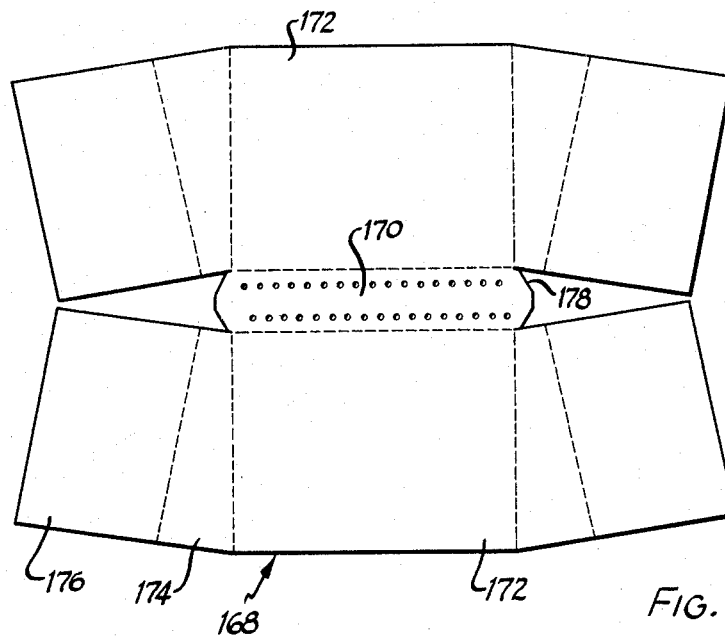
FIGURE 11 is a plan view of the pattern cut sheet of refractory metal used in forming the fourth embodiment.
Figure 12:
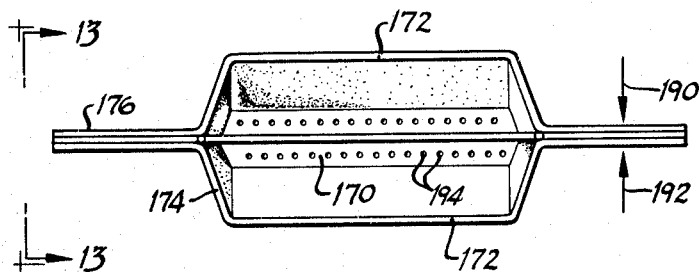
FIGURE 12 is a top plan view of the fourth embodiment.
Figure 13:
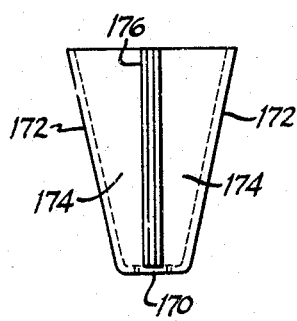
FIGURE 13 is an end elevation of the fourth embodiment.

As shown in FIGURES 10 and 12, the end wall halves 174 are bent inwardly along the base 170 to contact the angular end portions 178, FIGURE 11, of the base in snugly engaging relationship. Short weldments 180 are provided at the junctures and extend a short distance along the seam formed at the base of the axially extending tab portions 176. Prior to welding, a heater strip 182 having an elongated strip-like body portion 184 and end tab portions 186 is inserted between the side walls 172 whereby the end tab portions 186 are snugly engaged between the tab portions 176 extending from the end wall halves 174. The short weld portion 188 is effective to retain the heater strip 182 in position.

As shown in FIGURE 12, the heater strip 182 extends down the middle of the unit for uniformly heating powdered glass or glasss forming materials in the center of the unit. Also FIGURE 12 illustrates the manner in which the heater strip tab portions 186 are sandwiched between the axially extending tab portions 176 of the bushing.

No welding, other than the short welds 180 and 188, is required in the fabrication of this improved bushing structure. The ends of the units are sealed by clamping engagement with terminal clamps to be described hereinafter. The terminal clamps are effective to provide forces along the arrow lines 190 and 192 as shown in FIGURES 9 and 12 whereby fluid glass is retained within the bushing without leakage.

As shown in FIGURES 10-12 of the drawings, multiple feeding orifices 194 are provided in the bottom 170 of the bushing for feeding small molten streams of glass in the manner described for the previous embodiments.

Thus the fourth embodiment of the invention also provides a novel bushing for the production of continuous fibers from high-temperature, heat-softenable materials wherein refractory metals in sheet form are utilized in a unique folded construction, this embodiment utilizing limited welds which are capable of withstanding the thermal stresses encountered.

THE FIFTH EMBODIMENT

Figure 14:
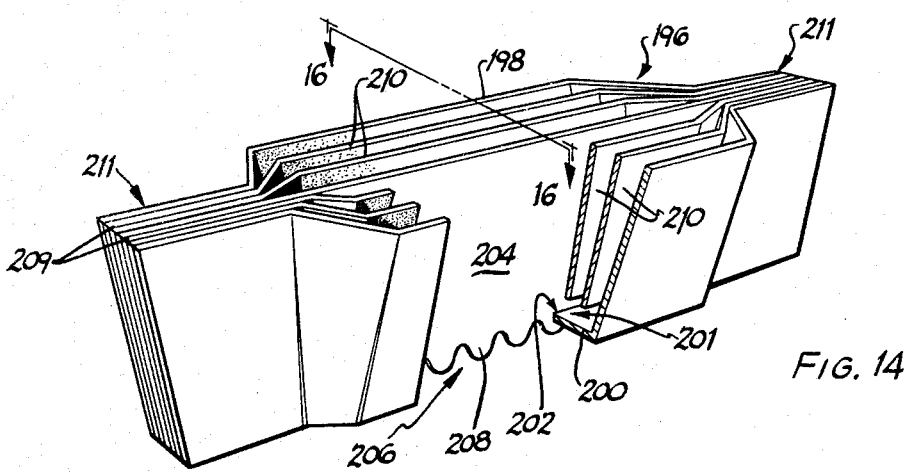
FIGURE 14 is a perspective view, partially broken away in section, showing a fifth embodiment of the invention.
Figure 15:
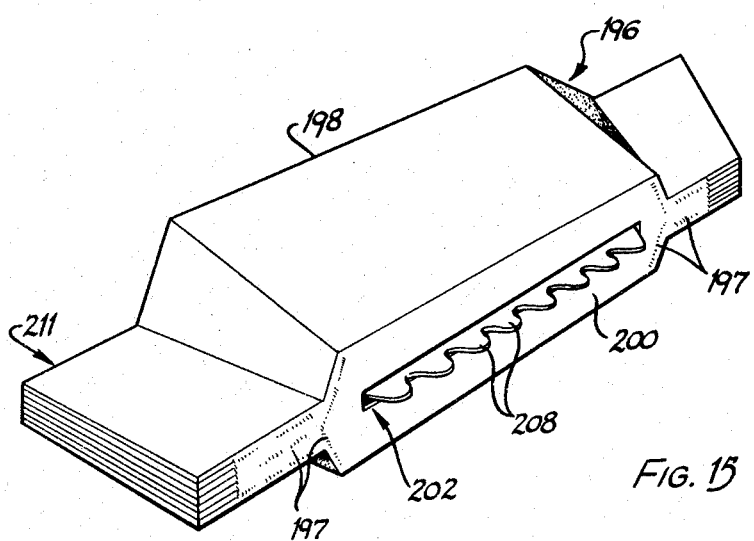
FIGURE 15 is a bottom perspective view of the fifth embodiment.
Figure 16:
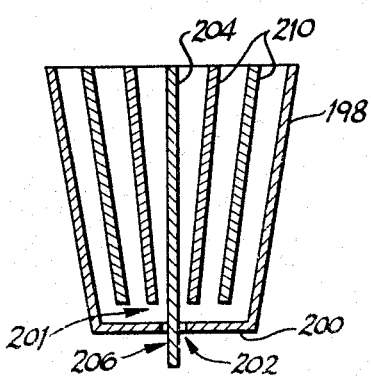
FIGURE 16 is a section view taken along line 16—16 of FIGURE 14.

The fifth embodiment of the invention, as shown in FIGURES 14–16, is similar in its folded configuration and short welds to the fourth embodiment as shown in FIGURES 9–13. However, in this fifth embodiment, a novel structural arrangement for feeding glass streams is provided.

Accordingly, the bushing 196 includes an outer wall 198, folded from a single sheet or plate of pattern cut sheet metal in the general manner in which the outer wall of the embodiment of FIGURES 9–13 is folded from a single sheet, and is welded at 197, FIGURE 15. In this embodiment, however, the bottom 200 of the bushing is provided with an elongated slot 202 along the center line thereof and the center heater strip 204 has a projecting scalloped edge section 206 extending through the slot in spaced relation from the sides of the slot to provide clearance for molten glass to flow downwardly along the projecting section 206.

The scalloped edge section 206 is provided with a plurality of rounded projections 208 whereby molten glass flowing through the slot 202 on each side of the center plate 204 is gathered into a plurality of fiber-forming streams by the surface tension of the glass around the projections.

In addition to the center heater strip 204, four additional heater strips 210 are provided in this embodiment and these are angularly disposed with respect to the center strip in a funnel-like array, FIGURE 16, to direct molten glass downwardly to the slot 202 on each side of the center strip. By utilizing a plurality of heater strips 210, very uniform heat distribution in the melt and uniformity of glass flow is provided. The strips 210 are spaced away from the bottom 200 of the bushing 196 as at 201 to permit molten glass to smoothly flow around the center plate 204 for fiber formation.

The ends of the bushing 196 are formed as electrical terminal ends 211 in the manner of the previous embodiment. These ends, which include the tab portions 209 of the heater strips 210, are clamped in the molten glass sealing relation by a terminal clamp to be hereinafter described. Thus welding is avoided except for the short welds 197 at the base of the structure as shown in FIGURE 15.

Thus the fifth embodiment of the invention also provides a bushing for the production of high temperature fibers wherein refractory metals in sheet form are utilized which have only limited weldments capable of withstanding the thermal stresses of glass melting. This embodiment of the invention is also characterized by a novel glass stream forming arrangement utilizing a scalloped heater plate positioned within a liquidus feeding slot in the bottom of the bushing.

FORMATION OF BUSHINGS

The following example typifies the manner of formation of bushings in accordance with this invention as set out in the various embodiments described hereinbefore.

Example I

A sheet of pure molybdenum of 1/16 inch thickness was heated in a protective argon atmosphere to a temperature of approximately 850° F. and immediately after removal from the furnace was pressed to a general U-shape. A plurality of aligned threaded openings were then formed in the bight portion of the U-shaped body and appropriately machined orifices or tips of molybdenum having mating threads were turned into the threaded openings. Terminals of copper, provided with appropriate water conduits for cooling and appropriate slots for receiving the ends of the U-shaped body were heated to 850° F. and the ends of the U-shaped body inserted therein for a constriction fit. The entire assembly was then placed in a refractory support for utilization in the preparation of glass fibers.

GLASS FEEDING ORIFICES

In the foregoing discussion, general reference has been made to the glass feeding orifices formed in the bases of the bushings. Since the bushings of the present invention involve either no welding or very limited welding, the manner whereby the molten glass flow apertures are produced without welding will be described.

Figure 17:
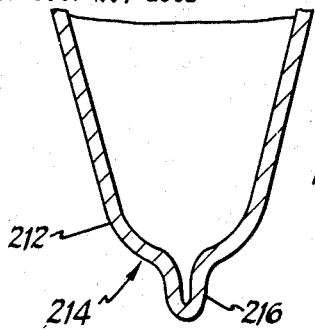
FIGURE 17 is a section view showing a partially formed flow orifice utilized with the embodiments of FIGURES 3–13.
Figure 18:
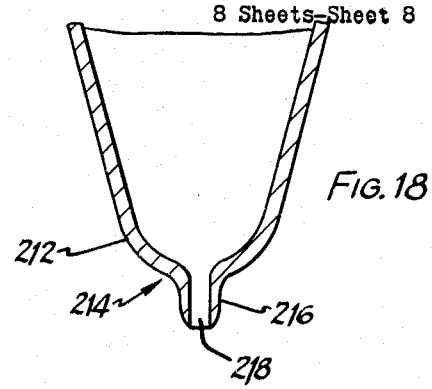
FIGURE 18 is a section view similar to FIGURE 17 after the molten glass flow orifice has been drilled.

As shown in FIGURES 17 and 18, the glass forming apertures are first punched and then drilled. In FIGURE 17 the numeral 212 represents a side wall formed integrally with a base 214 as shown in any of the embodiments of FIGURES 3 to 13 of the invention. In this aspect of the invention, the base 214 is punched downwardly to provide glass feeding orifice projections 216. After the punching operation, each projection 216 is drilled centrally to provide a glass feeding aperture 218, as shown in FIGURE 18. As illustrated in the various above-mentioned embodiments of the invention, the apertures 218 are multiple in number and can be placed in one or more aligned rows along the bottom of a bushing.

Figure 19:
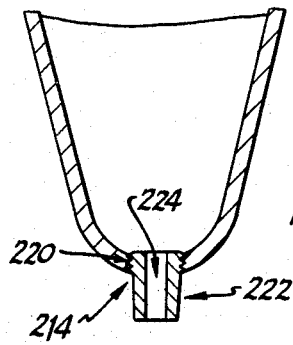
FIGURE 19 is a section view of a threaded glass flow orifice as applied to a FIGURE 3–13 embodiment.

As shown in FIGURE 19, the base 214 of a bushing is first provided with drilled and tapped holes 220 into which pre-formed tips 222 having their upper ends threaded to mate with the threads of the holes 220 are inserted. The pre-formed tips are provided with glass feeding orifices 224 to permit fluid glass to be exuded downwardly as small streams, as illustrated in FIGURES 1 and 2 of the drawings.

Figure 20:
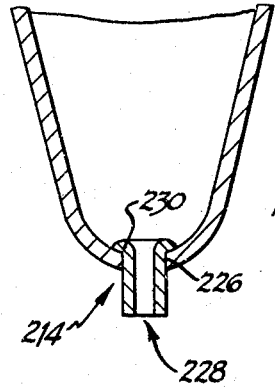
FIGURE 20 is a section view of a third glass flow orifice that can be utilized in the present invention.

As shown in FIGURE 20, the base 214 of a bushing made in accordance with the present concept is provided with one or more apertures 226, the side walls of which may have a very slight taper. Generally tubular tips 228, having a taper the same as that of the aperture 226, are forced into the apertures and peened over at 230 by pressure forming at a temperature where the metal is ductile.

In summary the glass forming apertures or tips disclosed in FIGURES 17–20 inclusive are adapted to use in the various embodiments of the invention shown in FIGURES 3 through 13 and are formed without welding.

TERMINAL CLAMP

In the description for each embodiment of the invention, it was pointed out that the terminals of the bushings are restricted in thickness whereby they can be clamped between the jaws of an electrical terminal clamp. One suitable form of terminal clamp for connecting cables to the ends of the bushings is shown in FIGURE 21. The clamp includes a body portion 232 of generally U-shaped configuration and having two forwardly extending arms 234 defining a slot or gap 236 therebetween; this slot or gap is of a width slightly larger than the thickness of the terminal ends of the bushing to which it is to be fitted. A bolt 238 is fitted through the body 232 of the terminal clamp in a suitable hole provided therethrough just beneath the bottom extremity of the slot 236 to hold U-shaped bracket members 240 in clamping engagement on each side of the body 232. The brackets 240 are provided centrally with apertures 242 which permit the bolt 238 to pass therethrough. The bolt is provided with a nut 244 which when tightened causes the brackets 240 to bear against the rear and front portions of the body 232 of the clamp to compress the arms 234 toward each other. When a terminal end, such as the portion 106 in FIGURES 3 and 4 is inserted into the slot 236, the clamping pressure provided by the bolt 238 will be effective to form a positive engagement between the terminal clamp and the terminal end of the bushing.

As previously mentioned, with respect to the embodiments of the invention shown in FIGURES 9–16, the clamping pressure provided by the terminal clamp is effective to hold the axially extending tab portions of the side walls and the end tab portions of the heater strips in fluid glass sealing relationship. Thus no end welds are relied upon for closing the ends of the bushings of any of the embodiments of the present invention.

The terminal clamps utilized in the present invention are also water cooled to prevent melting thereof, since they may be made of copper for its excellent electrical conducting characteristics, this metal having a melting point substantially lower than that of the metals of which the bushings themselves are made. For this purpose, fluid conducting conduits 246 are provided in the body 232 and arms 234 of the terminal clamp. These conduits terminate at the surface of the clamp in threaded openings whereby pipes 248 and 250 can be connected for inlet and effluent cooling fluid.

A bus bar 252 is fastened to the rear end of the body 232 of the terminal clamp by means of bolts 254 passed through suitable openings in the bus bar and into threaded openings in the terminal clamp. Although not shown, electrical cables are connected to the bus bar whereby electric current is fed into the terminal clamp and thence into and through the bushings made in accordance with the present invention.

MATERIALS OF CONSTRUCTION

The metals particularly contemplated for use in producing bushings in accordance with the present invention include tungsten, molybdenum, tantalum and alloys thereof. Tungsten has a melting point of 6200° F. and molybdenum and tantalum each have melting points of about 5500° F. Thus it is within the scope of the present invention to utilize these metals for producing high temperature melting glasses as for example in the temperature range of 1200° F. to 4500° F., thus allowing a safe margin to prevent destruction of the bushings by melting. In some instances, by exercising a sufficient degree of caution, temperatures above this level can be approached for producing fibers of even higher melting points.

In addition to the pure metals, alloys of these materials can be used as follows:

|  | Melting temperature, degrees F. |
|---|---|
| Tungsten and molybdenum, all proportions | 5500–6200 |
| Tungsten and tantalum, all proportions | 5500–6200 |
| Molybdenum and tantalum, all proportions | 5500 |

Although the invention has been described with particular emphasis on the refractory metals, it will be evident that bushings in accordance with the present invention can be made from more ductile metals of lower melting points. Thus, in a broad aspect, the invention is applicable to the use of metals such as platinum and its alloys with iridium and rhodium as previously used in welded structures. These metals provide a melting range of 3192° F. for platinum to 4700° F. for iridium, with intermediate temperatures being provided by the various alloys.

As previously mentioned, the terminal ends of the bushings of the present invention, particularly those illustrated in the embodiments of FIGURES 3–8, can be made of the same material from which the side walls and heater strips are made or they can be made of a lower melting material by the inclusion of suitable cooling conduits therein. Thus it is within the scope of the invention to use copper and its higher melting alloys as the terminal ends of the bushings to provide good electrical conductivity. Due to the fact that the metals tungsten, molybdenum, tantalum and alloys thereof as contemplated for use in the present invention are readily oxidizable, even though they are resistant to very high temperatures, it is necessary to operate them in a non-oxidizing environment. One suggested method for operation comprises placing a gas-retaining housing 31 around the bushing 32, as shown in FIGURES 1 and 2 of the drawings, and introducing an inert gas such as argon, neon, helium, hydrogen or the like into surrounding protecting relationship to the bushing through a conduit 33. A gas-retaining cover 35 is normally placed over the opening 37 of the housing 31, except when charging heat-softenable materials to the bushing 32. A very slight gas pressure will be maintained in the casing 31 to provide a slight flow from the bottom fiber discharge opening 39, and thus prevent entrance of oxygen contained in the air and provide operation of the bushing without destruction.

The present invention provides a method and apparatus for producing glass fibers of substantially higher softening points than those now capable of being produced by bushings made of platinum and platinum-iridium alloys. In the past, an upper limit of about 2200° F. has been imposed by platinum and its alloys. However, in accordance with this invention, fibers having softening points extending upwardly to the range of about 4500° F. can be produced. Generally, it can be stated that these higher melting glasses contain as principal ingredients such high melting materials as zirconia ($ZrO_2$) and thoria ($ThO_2$).

I claim:

1. In an electrically heated container for melting glass, a one-piece metal wall of elongated configuration, said wall including laterally spaced upstanding sides, a bottom, and inwardly extending ends integral with said sides with electrical terminal tabs integral with said ends, said ends extending inwardly from said sides to an intermediate point therebetween and contacting the bottom at the ends thereof, said terminals extending axially from said ends, and welds joining said ends with said bottom at the point of contact.

2. The electrically heated container as defined in claim 1 including a heater strip having its ends positioned between said terminal tabs and extending the length of the continer and within the confines of said sides.

3. In an electrically heated bushing for melting glass and forming molten streams therefrom, a one-piece refractory metal wall of elongated configuration, said wall including laterally spaced upstanding sides, a bottom, and inwardly extending ends integral with said sides with electrical terminals integral with said ends, said ends extending inwardly from said sides to an intermediate point therebetween and contacting the bottom at the ends thereof, said terminals extending axially from said ends, welds joining said ends with said bottom at the points of contact, an axially extending slot in said bottom, said slot having spaced longitudinal sides, a heater strip positioned between said terminals and extending therebetween, said heater strip having a portion extending through said slot in closely spaced relation to the sides thereof, and molten glass stream forming means formed on said heater strip portion.

4. In a melter-feeder for heat-softenable materials,
 a one-piece sheet wall,
 said wall including laterally spaced upstanding sides, a bottom and inwardly extending end plates integral with said sides with electrical terminal tabs integral with said ends,
 said ends extending inwardly from said sides so that said terminal tabs abut one another to close said ends, and said ends contacting the bottom at the ends of the bottom,
 short welds joining said ends with said bottom at the points of contact,
 a plate-like heater strip having its ends positioned between said terminal tabs and extending the length of said melter,
 a feeding orifice in said bottom,
 and a portion of said heater strip extended through said orifice as a feed projection.

5. In a melter for heat-softenable materials,
 a one-piece sheet wall of metal, said wall including laterally spaced upstanding sides, a bottom, and inwardly extending end plates integral with said sides with electrical terminal tabs integral with said ends, said ends extending inwardly from said sides so that said terminal tabs abut one another to close said ends, and said ends contacting the bottom at the ends of the bottom, short welds joining said ends with said bottom at the points of contact, a feeding orifice in said bottom having a tubular portion deformed away from the plane of the bottom and integral with the material of the bottom, and said orifice having an opening extending axially therethrough.

6. In a melter-feeder for heat-softenable materials, a one-piece sheet wall of temperature-resistant metal, said wall including laterally spaced upstanding sides, a bottom, and end plates integral with said sides with electrical terminal tabs integral with said ends, said ends extending inwardly from said sides so that said terminal tabs abut one another to close said ends, and said ends contacting the bottom at the ends of the bottom, welds joining said ends with said bottom at the points of contact, a threaded aperture in said bottom, a feeding orifice having a tubular body with an outside threaded portion turned into said aperture in sealing relation against leakage of heat-softenable material, and the remainder of said orifice extending away from the plane of said bottom.

7. In a melter-feeder for heat-softenable materials, a one-piece sheet wall of temperature resistant metal, said wall including laterally spaced, upstanding sides, a bottom, and end plates integral with said sides with electrical terminal tabs integral with said ends, said ends extending inwardly from said sides so that said terminal tabs abut one another to close said ends, and said ends contacting the bottom at the ends of the bottom, welds joining said ends with said bottom at the points of contact, an aperture in said bottom, a feeding orifice having a tubular body positioned in said aperture and an annular shoulder at one end contacting said bottom in sealing relation against leakage of heat-softenable material, and the remainder of said orifice extending away from the plane of said bottom.

8. In a melter-feeder for heat-softenable materials, unitary side wall means, end wall means, and bottom means, and with electrical terminal means integral with said end wall means, said end wall means extending inwardly from said side wall means so that said electrical terminal means abut one another to close said end wall means, and said end wall means contacting said bottom means at the ends of said bottom means, weld means joining said end wall means with said bottom means at the points of contact, a heater having a plate-like portion, and said heater being positioned within the confines of said wall means, a feeding orifice in said bottom means, and said plate-like portion of said heater extending through said orifice as a feed projection.

References Cited in the file of this patent

UNITED STATES PATENTS

| | | |
|---|---|---|
| 1,999,796 | Zinser | Apr. 30, 1935 |
| 2,276,295 | Ferguson | Mar. 17, 1942 |
| 2,323,000 | Auwarter et al. | June 29, 1943 |
| 2,377,772 | Fletcher et al. | June 5, 1945 |
| 2,501,980 | Wolfe | Mar. 28, 1950 |
| 2,557,530 | Bancroft | June 19, 1951 |
| 2,794,058 | Russell | May 28, 1957 |
| 2,931,093 | Luckey | Apr. 5, 1960 |
| 2,965,696 | Brewer | Dec. 20, 1960 |
| 3,031,735 | Jepson | May 1, 1962 |
| 3,056,846 | Glaser | Oct. 2, 1962 |